US 8,004,135 B2

(12) United States Patent
Peterson et al.

(10) Patent No.: US 8,004,135 B2
(45) Date of Patent: Aug. 23, 2011

(54) ELECTRIC MOTOR AND CONTROLLER ASSEMBLY WITH INTEGRATED SENSOR DEVICE

(75) Inventors: Gregory A. Peterson, South Barrington, IL (US); Peter F. Stultz, Elgin, IL (US); Thomas Musser, St. Charles, IL (US); Daniel Hilton, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 618 days.

(21) Appl. No.: 11/656,557

(22) Filed: Jan. 22, 2007

(65) Prior Publication Data

US 2008/0174213 A1 Jul. 24, 2008

(51) Int. Cl.
*H02K 5/15* (2006.01)
*H02K 15/14* (2006.01)

(52) U.S. Cl. .. 310/89; 310/68 R; 310/68 B; 310/156.05; 310/156.06; 310/400; 310/433

(58) Field of Classification Search ............. 310/68 R, 310/89, 156.05, 156.06, 400–433, 68 B; *H02K 5/15, H02K 15/14*
See application file for complete search history.

(56) References Cited

U.S. PATENT DOCUMENTS

| | | | | |
|---|---|---|---|---|
| 3,972,501 A | * | 8/1976 | Plough | 249/42 |
| 5,293,125 A | * | 3/1994 | Griffen et al. | 324/173 |
| 5,319,271 A | * | 6/1994 | Shimada et al. | 310/68 B |
| 5,566,055 A | * | 10/1996 | Salvi, Jr. | 361/816 |
| 6,333,576 B1 | * | 12/2001 | Ishikawa et al. | 310/85 |
| 6,400,050 B1 | | 6/2002 | Naman et al. | |
| 6,486,653 B2 | | 11/2002 | Osborn et al. | |
| 6,522,130 B1 | | 2/2003 | Lutz | |
| 6,932,382 B2 | | 8/2005 | Hayes et al. | |
| 6,984,916 B2 | | 1/2006 | Ambrose et al. | |
| 7,352,092 B2 | * | 4/2008 | Levine et al. | 310/71 |
| 7,400,076 B2 | * | 7/2008 | Utsumi et al. | 310/263 |
| 7,420,302 B2 | * | 9/2008 | Archer et al. | 310/90 |
| 7,453,175 B2 | * | 11/2008 | Nakanishi et al. | 310/68 B |
| 7,456,531 B2 | * | 11/2008 | Yagi | 310/68 R |
| 7,479,718 B2 | * | 1/2009 | Kikuchi et al. | 310/68 R |
| 7,521,826 B2 | * | 4/2009 | Hempe et al. | 310/50 |
| 2002/0167238 A1 | * | 11/2002 | Kogure et al. | 310/89 |
| 2006/0022628 A1 | | 2/2006 | Okumatsu et al. | |
| 2006/0226719 A1 | * | 10/2006 | Nakanishi et al. | 310/68 B |
| 2008/0174212 A1 | * | 7/2008 | Rudel et al. | 310/68 B |
| 2009/0015084 A1 | * | 1/2009 | Kalavsky et al. | 310/89 |

* cited by examiner

*Primary Examiner* — Quyen Leung
*Assistant Examiner* — Terrance Kenerly
(74) *Attorney, Agent, or Firm* — Harness, Dickey & Pierce, P.L.C.

(57) ABSTRACT

An integrated electric motor and controller assembly includes a motor, a controller mounted to the motor, and a sensor device disposed at an interface between the motor and the controller. The sensor device includes a sensor disposed at the controller and a magnet disposed at the motor. An alignment structure is provided at the interface between the motor and the controller for positioning the sensor relative to the magnet when the controller is mounted to the motor. The magnet is recessed in the motor and the sensor is protected by a controller housing of the controller. This arrangement has the advantages of protecting the sensor device from damage during shipment and assembly and providing a quick assembly and connection of the sensor device to the motor and the controller.

17 Claims, 6 Drawing Sheets

ELECTRIC MOTOR AND CONTROLLER ASSEMBLY WITH INTEGRATED SENSOR DEVICE

FIELD

The present disclosure relates generally to electric motor controllers, more particularly to electric motor and controller assemblies with integrated sensor devices.

BACKGROUND

The statements in this section merely provide background information related to the present disclosure and may not constitute prior art.

It is known to incorporate a sensor device in a motor to monitor the rotation of a rotor of the motor. A hall effect sensor device for the motor generally includes a magnet and a pickup sensor. The magnet is secured to an end of a rotor shaft and rotates with the rotor shaft, whereas the pickup sensor is secured to a motor housing in the proximity of the magnet. As the magnet rotates with the rotor shaft, the current-carrying pickup sensor detects the rotation of the magnet and hence the rotation of the rotor shaft and generates electrical signals corresponding to the revolutions of the rotor shaft. The electrical signals are then transmitted to a controller positioned remotely from the motor via electrical wires.

This prior art arrangement, however, has disadvantages in assembling and shipping. Connecting the motor and the sensor device to the controller requires the use of an external wiring harness, causing an increased assembly time. Moreover, because of the use of the external wiring harness, various components used with the external wiring harness are necessary, such as EMI retarding components, and connectors, etc., thereby increasing the manufacturing costs. Further, because the prior art arrangement makes the sensor device exposed to the outside environment, the sensor device is susceptible to damage during shipment and assembly of the motor.

Therefore, it is desirable to obtain an arrangement of the motor, the motor controller, and the sensor device that is compact and is relatively easy to assemble while minimizing damage to the sensor device during shipment and assembly.

SUMMARY

In one form, a motor controller includes a controller housing adapted to be mounted to a motor including a magnet, a sensor mounted to the controller housing, and a mating feature provided at the controller housing. The mating feature positions the sensor relative to the magnet when the controller housing is mounted to the motor.

In another form, a motor controller includes a controller housing adapted to be mounted to a motor, a sensor provided at the controller housing, a mating feature for positioning the sensor relative to the motor when the controller housing is mounted to the motor.

In yet another form, an electric motor and controller assembly includes an electric motor having an end housing, a controller having a controller housing removably mounted to the end housing of the electric motor, a sensor device, and an alignment structure. The sensor device includes a magnet disposed in the end housing and a sensor disposed in the controller housing. The alignment structure positions the sensor relative to the magnet when the controller housing is mounted to the end housing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Corresponding reference numerals indicate corresponding parts throughout the several views of the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
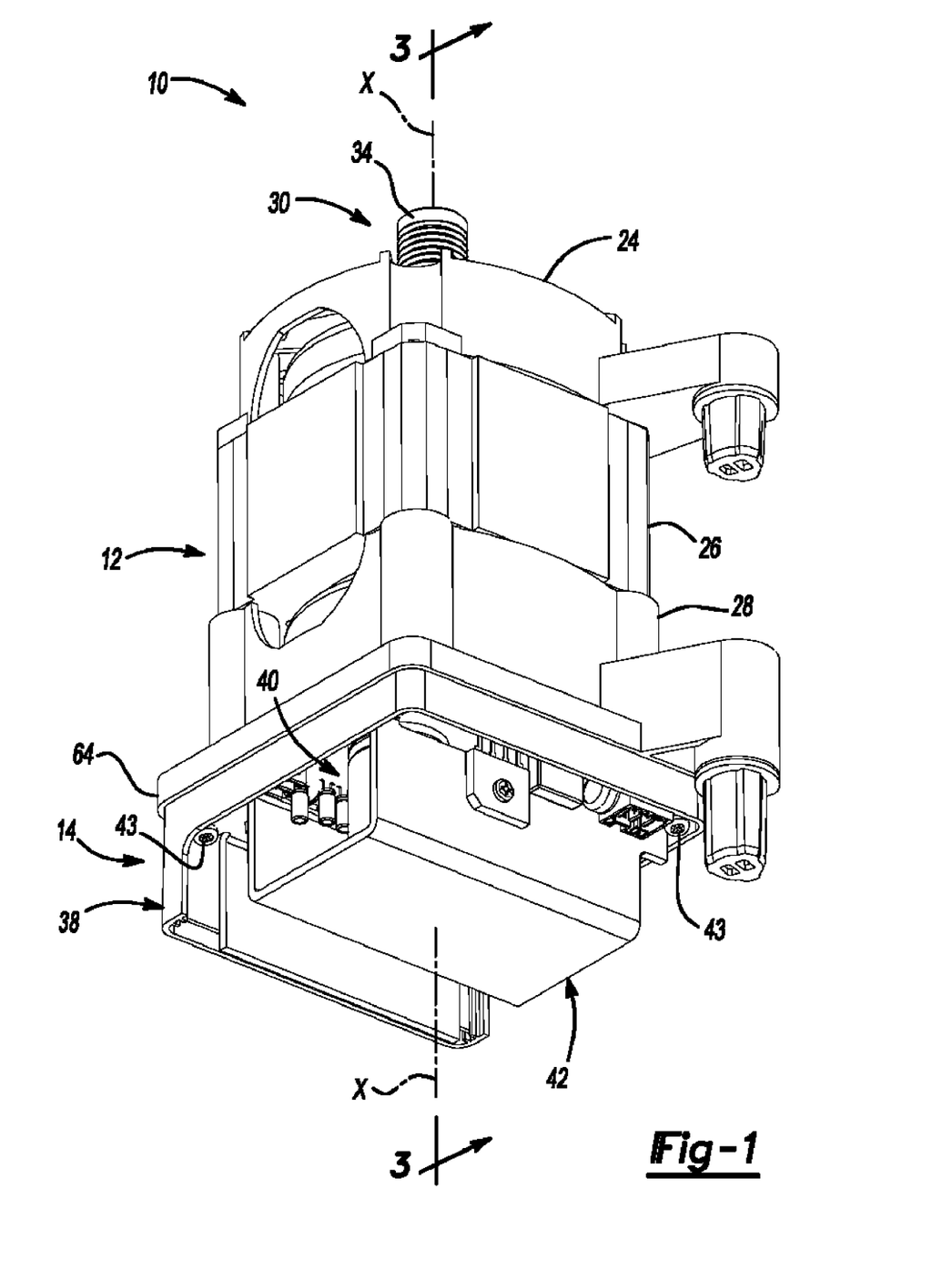
FIG. 1 is a perspective view of an electric motor and controller assembly constructed in accordance with the teachings of the present disclosure.
Figure 2:
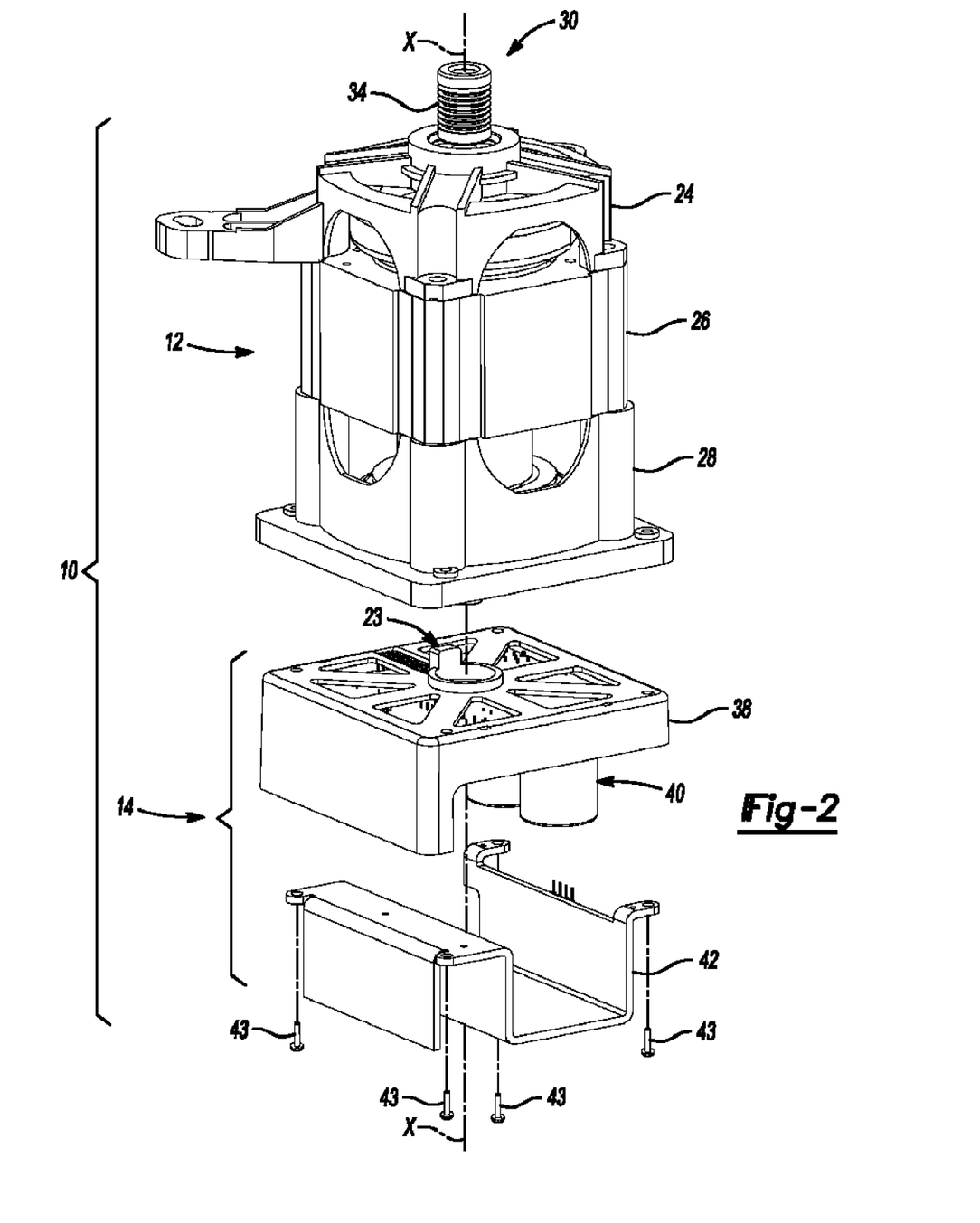
FIG. 2 is a partial exploded perspective view of the electric motor and controller assembly of FIG. 1 in accordance with the teachings of the present disclosure.
Figure 3:
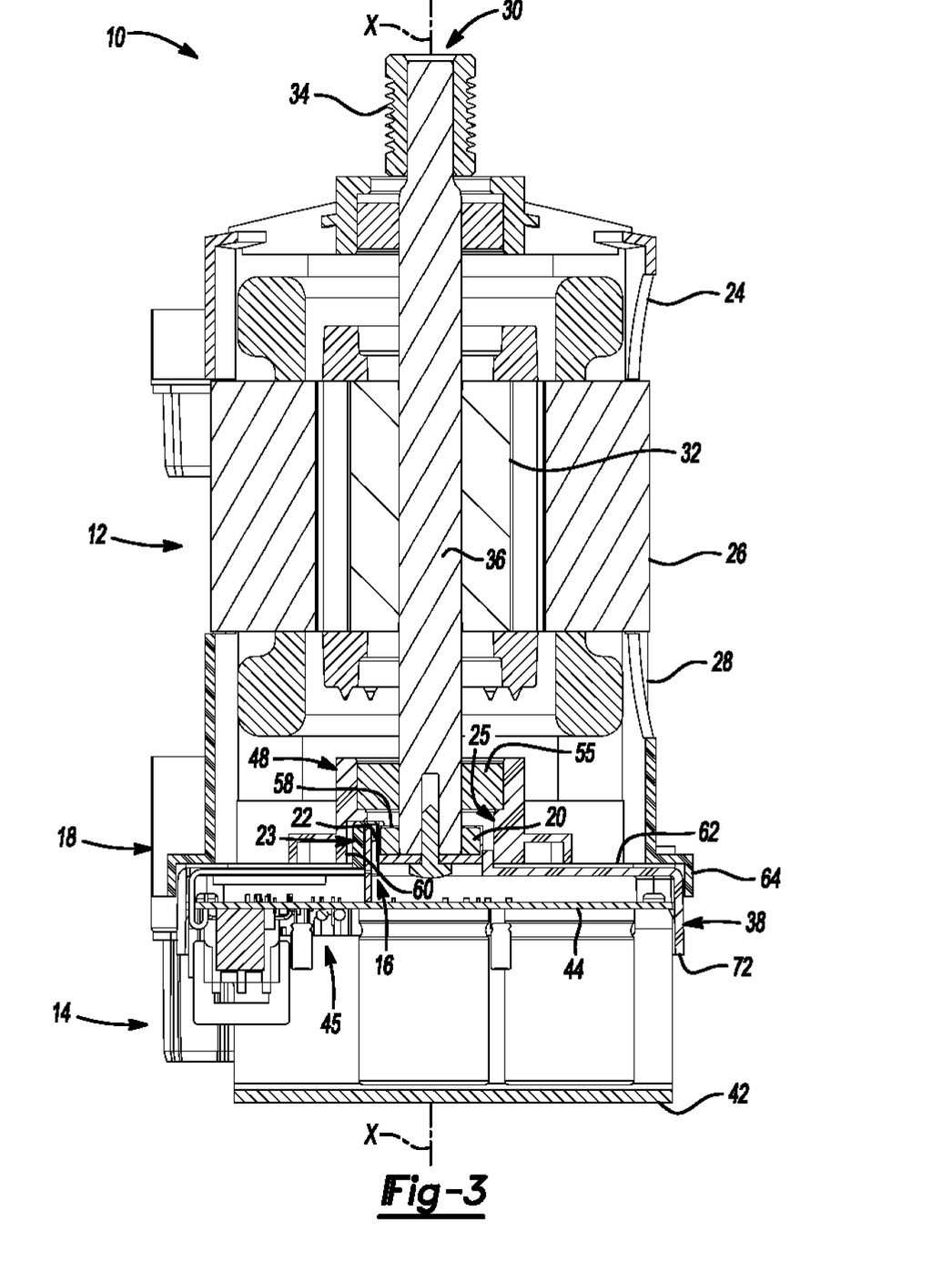
FIG. 3 is a cross-sectional view of the electric motor and controller assembly, taken along line 3-3 of FIG. 1.

Referring to FIGS. 1 to 3, an integrated electric motor and controller assembly constructed in accordance with the teachings of the present disclosure is illustrated and generally indicated by reference number 10. The assembly 10 includes an electric motor 12, a motor controller 14 mounted to the electric motor 12, and a hall effect sensor device 16 located at an interface 18 between the electric motor 12 and the controller 14. As clearly shown in FIG. 3, the sensor device 16 includes a magnet 20 provided at the motor 12 and a sensor 22 provided at the controller 14. An alignment structure, which includes complementary mating features 23 and 25, is provided at the interface 18 for positioning the sensor 22 relative to the magnet 20 when the motor controller 14 is mounted to the motor 12. The mating feature 23 is provided at the motor controller 14, and the mating feature 25 is provided at the electric motor 12.

The electric motor 12 includes a mounting flange 24, a stator 26, an end housing 28, a rotor shaft 30, and a rotor 32 mounted to the rotor shaft 30 and surrounded by the stator 26. The rotor shaft 30 extends in a longitudinal direction X of the motor 12 and is surrounded by the mounting flange 24, the stator 26, and the end housing 28. The rotor shaft 30 includes an output end 34, and a rear end 36 opposite to the output end 34. The output end 34 extends outwardly of the mounting flange 24 for driving a rotatable shaft (not shown) of an apparatus (not shown). The rear end 36 is disposed in the end housing 28. The mounting flange 24 is adapted to mount the assembly 10 to a panel (not shown) of the apparatus.

The electric motor 12 can be a variable speed controlled induction motor, a brushless permanent magnet motor or a switched reluctance motor. Since the structure of the motor is known in the art, the detailed description thereof is omitted herein for clarity.

The controller 14 includes a controller housing 38, a circuit board assembly 40 mounted to the controller housing 38, and a protective cover 42 removably attached to the controller housing 38 for protecting the circuit board assembly 40. The protective cover 42, made of a metal, is connected to the end housing 28 of the electric motor 12 by screws 43 and also functions as a heat sink. The heat generated inside the electric motor 12 can be transferred through the screws 43 to the protective cover 42, which, in turn, dissipates the heat to outside environment. Accordingly, the protective cover 42 is properly configured not only to conform to the profile of the circuit board assembly 40 to protect the circuit board assembly 40, but also to have a sufficient surface area to improve heat transfer. The circuit board assembly 40 includes a printed circuit board 44 and various circuit components 45 on the printed circuit board 44.

Figures 4, 5, 6:
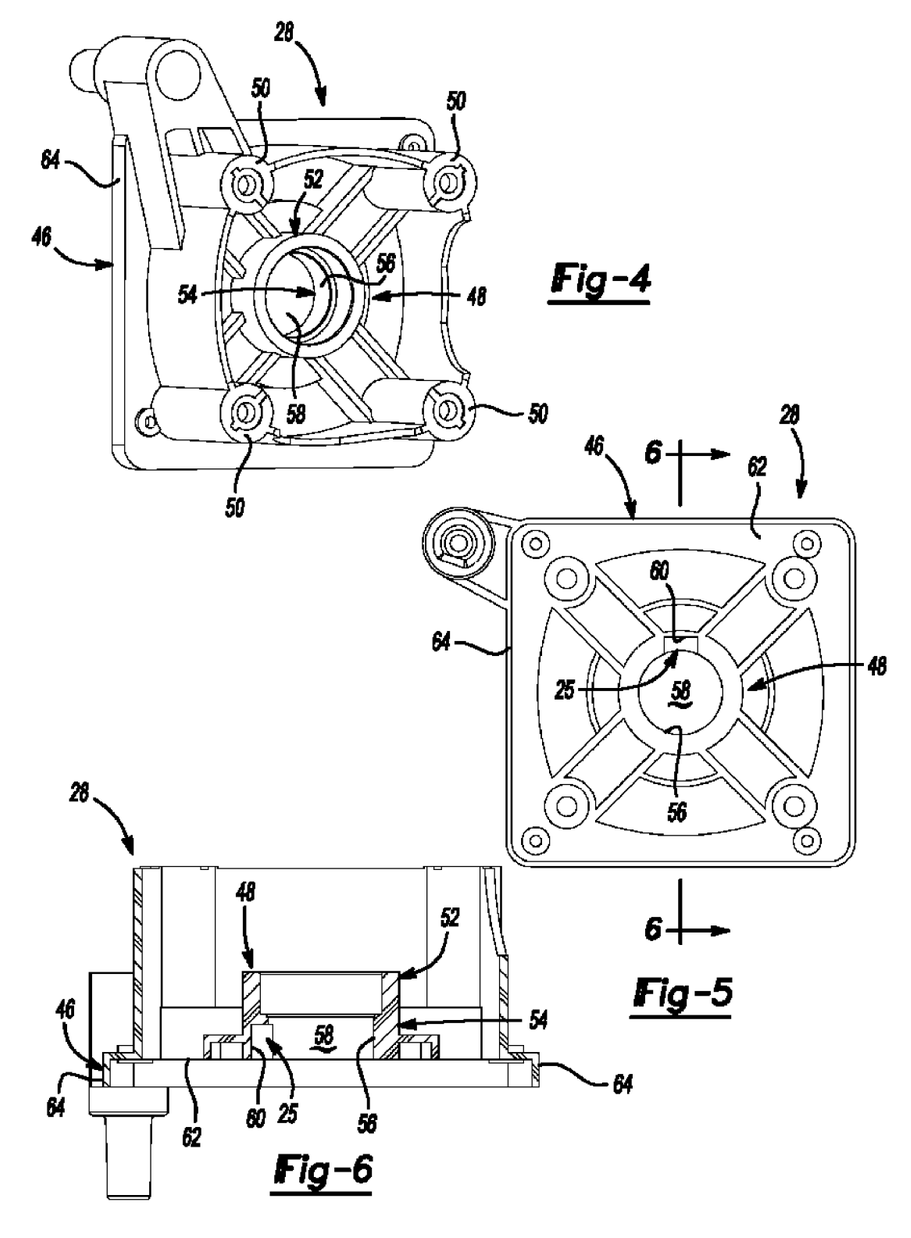
FIG. 4 is a top perspective view of an end housing of a motor.
FIG. 5 is a bottom view of the end housing.
FIG. 6 is a cross-sectional view of the end housing, taken along line 6-6 of FIG. 5.

Referring to FIGS. 4 to 6, the end housing 28 is made of plastic, preferably by injection molding. The end housing 28 includes a base portion 46 and a hollow member 48 extending forwardly from the base portion 46. The word "forwardly" is used throughout the disclosure to refer to a position proximate to or a direction toward the output end 34 of the motor 12, whereas the word "rearwardly" or "rear" is used to refer to a position distal from or a direction away from the output end 34 of the motor 12.

Four attachment legs 50 extend forwardly from the base portion 46 for attaching the end housing 28 to the stator 26. The hollow member 48 includes a first cylindrical portion 52 and a second cylindrical portion 54 adjacent to the first cylindrical portion 52. The first cylindrical portion 52 defines a bearing seat for receiving a bearing 55 therein. The bearing 55 rotatably supports the rotor shaft 30 in the end housing 28.

The mating feature 25 is provided at the second cylindrical portion 54, and includes an inner surface 56, a hollow space 58 defined by the inner surface 56, and a cutout portion 60 in the proximity of the hollow space 58. As shown in FIG. 3, when the rotor shaft 30 is positioned in place, the rear end 36 of the rotor shaft 30 is located in the hollow space 58.

The base portion 46 defines a stop surface 62 facing the controller 14. A peripheral wall 64 is provided on the end housing 28 and extends rearwardly from and surrounding the stop surface 62.

Figures 7, 8, 9:
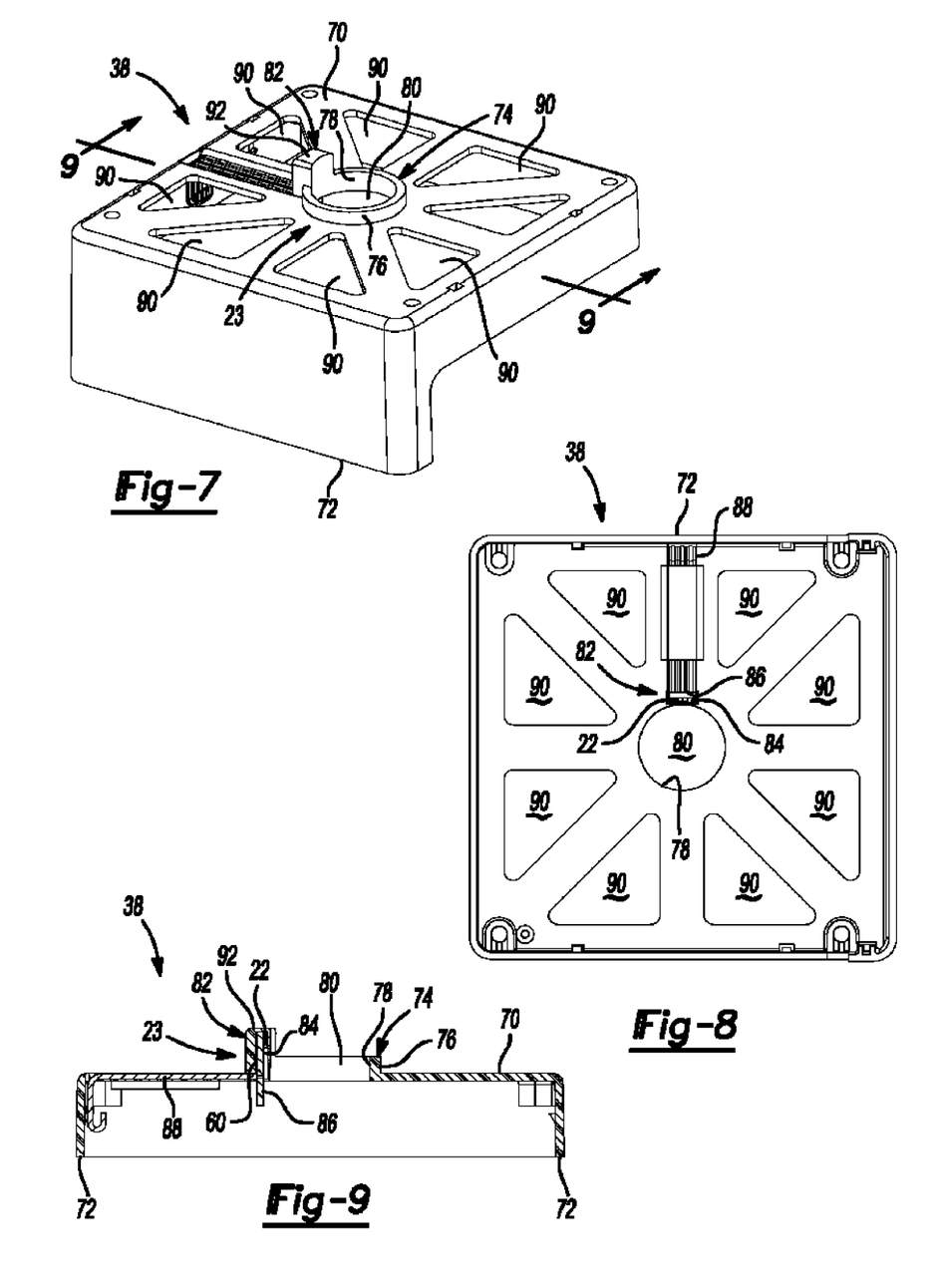
FIG. 7 is a top perspective view of a controller housing of a controller.
FIG. 8 is a bottom view of the controller housing.
FIG. 9 is a cross-sectional view of the controller housing, taken along line 9-9 of FIG. 7.

Referring to FIGS. 7 to 9, the controller housing 38 is made of plastic and preferably by injection molding. The controller housing 38 includes a mounting portion 70 for engaging the base portion 46 of the end housing 28, a peripheral wall 72 extending rearwardly from the mounting portion 70, and the mating feature 23 extending forwardly from the mounting portion 70.

The mating feature 23 includes a first positioning member in the form of a positioning flange 74 and a second positioning member in the form of a protrusion 82 proximate the positioning flange 74. The positioning flange 74 is inserted into the hollow space 58 of the end housing 28. The positioning flange 74 has an outer surface 76 for contacting the inner surface 56 of the second cylindrical portion 54 and an inner surface 78 defining a central opening 80.

The protrusion 82 defines a recess 84 for receiving therein the sensor 22 and a sensor circuit board 86. A ribbon cable 88 is mounted on the mounting portion 70 and electrically connects the sensor 22 and the sensor circuit board 86 to the underlying circuit board assembly 40. The protrusion 82 has a height larger than that of the positioning flange 74 and has an end surface 92. The mounting portion 70 is formed with a plurality of openings 90 for improving air circulation between the motor 12 and the controller 14 and for reducing the material for the controller housing 38.

Figure 10:
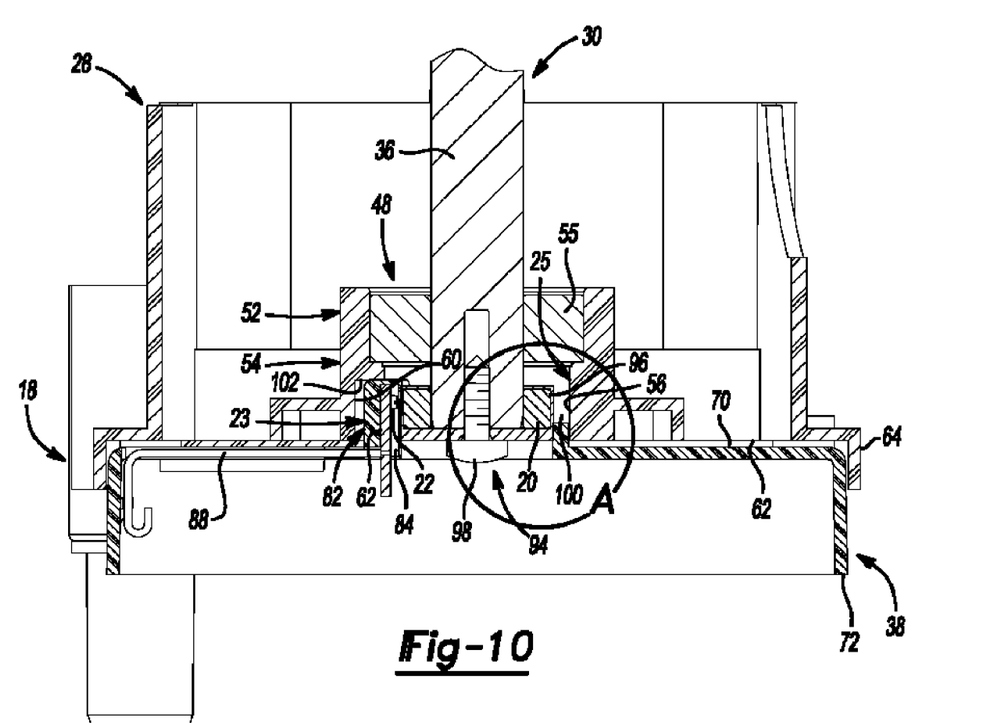
FIG. 10 is a partial cross-sectional view similar to FIG. 3, but showing only components at the interface between the motor and the controller for clarity.
Figure 11:
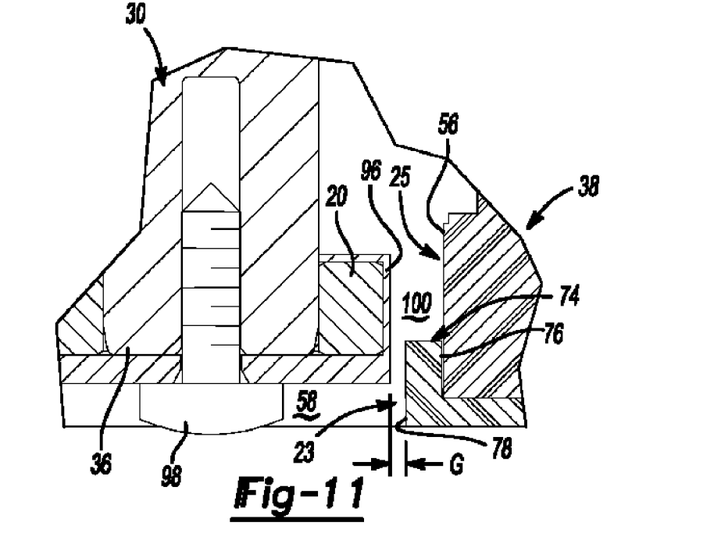
FIG. 11 is an enlarged view of portion A of FIG. 10.

Referring to FIGS. 10 and 11, the magnet 20 of the sensor device 16 is mounted to the rear end 36 of the rotor shaft 30 by a retaining member 94, which, in this exemplary embodiment, includes a shield cup 96 surrounding the magnet 20 and a rivet 98 for securing the shield cup 96 and the magnet 20 to the rear end 36 of the rotor shaft 30. The magnet 20 includes multiple individual pieces spaced equally around the rear end 36 of the rotor shaft 30, constituting multiple poles. An annular space 100 is formed between the shield cup 96 and the inner surface 56 of the second cylindrical portion 54.

When the controller housing 38 is mounted to the end housing 28, the peripheral wall 72 of the controller housing 38 engages the peripheral wall 64 of the end housing 28. At the same time, the positioning flange 74 is inserted into the annular space 100 and the protrusion 82 is inserted into the cutout portion 60. The magnet 20 and the rear end 36 of the rotor shaft 30 are partly located in the central opening 90 of the positioning flange 74. When the mounting portion 70 contacts the stop surface 62 of end housing 28, this contact prevents further movement of the controller housing 38 toward the end housing 28. Accordingly, the sensor 22 is properly positioned relative to the magnet 20.

Alternatively, the protrusion 82 and the cutout portion 60 may be so configured that when the sensor 22 is positioned in place, the end surface 92 of the protrusion 82 contacts an end wall 102 of the cutout portion so that the end wall 102 of the cutout portion 60 functions as a stop surface for preventing further movement of the controller housing 38 into the end housing 28.

The mating feature 23 of the controller housing 38 is used to position the sensor 22 relative to the motor 12, particularly the magnet 20, when the controller housing 38 is mounted to the end housing 28 of the motor 12. When the positioning flange 74 is inserted into the annular space 100, the sensor 22 is properly positioned in the radial direction of the motor 12. When the protrusion 82 is inserted into the cutout portion 60, the sensor 22 is properly positioned in the circumferential direction of the motor 12. Therefore, the alignment structure that includes the mating feature 23 of the controller housing 38 and the mating feature 25 of the end housing 28 aligns and positions the sensor 22 relative to the magnet 20 automatically when the controller 14 is mounted to the motor 12.

As clearly shown in FIG. 11, the positioning flange 74 has a thickness smaller than that of the annular space 100 defined between the inner surface 56 of the second cylindrical portion 54 and the shield cup 96 around the magnet 20. Therefore, when the positioning flange 74 is inserted into the annular space 100 with the outer surface 76 of the positioning flange 74 contacting the inner surface 56 of the second cylindrical portion 54, an air gap G is formed between the inner surface 78 of the positioning flange 74 and the shield cup 96. The air gap is in the range of about 0.040 inch to about 0.090 inch, preferably between 0.070 inch and 0.090 inch.

It should be understood and appreciated that while the positioning flange 74 has been illustrated as an annular flange, the positioning flange 74 can have other configurations. For example, a multiple-piece structure can be provided at the same location of the positioning flange 74, without departing from the spirit of the present disclosure, as long as the structure positions the sensor 22 in the radial direction of the magnet 20 and maintains a proper air gap between the magnet 20 and the sensor 22. Moreover, instead of a circular shape, the positioning flange 74 can have other shapes such as rectangular, square, triangular, or polygonal.

It should be understood and appreciated that the alignment structure that includes the mating features 23 and 25 is not limited to a plug-and-receptacle configuration and may have other configurations which serve to guide the sensor 22 into alignment with the magnet 20 when the motor controller 14 is mounted to the motor 12.

With the integrated electrical motor and controller assembly 10, various components employed in known designs are preferably eliminated, including wiring harnesses commonly provided between motors and controllers, EMI retarding components commonly included in the wiring harnesses, connectors, etc. This integrated electric motor and controller assembly 10 results in a more compact construction.

Moreover, the alignment structure allows for automatic alignment of the sensor 22 relative to the magnet 20 when the controller 14 is mounted to the motor 12. As a result, the alignment of the sensor device 16 and the mounting of the controller 14 to the motor 12 can be achieved in one assembling step, thereby significantly reducing the assembly time.

Further, because the magnet 20 is recessed within the end housing 28 and the sensor 22 is carried and protected by the protrusion 82, the magnet 20 and the sensor 22 are less likely to be damaged during shipment and assembly.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electric motor and controller assembly, comprising:
an electric motor comprising rotor shaft extending along a longitudinal axis from a rear end to an output end;
the electric motor further comprising an end housing surrounding the rear end of the rotor shaft, the end housing rotatably supporting the rear end of the rotor shaft;
a magnet mounted at the rear end of the rotor shaft;
a controller removably mounted at a rearward side of the end housing outside of the electric motor and parallel to the longitudinal axis, such that the controller can be disassembled from the end housing without disassembling the end housing from the electric motor;
the controller comprising a sensor and a controller housing, the controller housing including an alignment structure provided at an interface between the controller and the end housing for positioning the sensor relative to the magnet when the controller housing is mounted to the end housing; and
wherein the controller housing does not support the rotor shaft;
wherein the alignment structure includes a first positioning member for positioning the sensor in a radial direction of the longitudinal axis and a second positioning member for positioning the sensor in a circumferential direction of the longitudinal axis;
wherein the second positioning member includes a protrusion adapted to be inserted into a cutout portion of the end housing; and
wherein the protrusion defines a recess and the sensor is received in the recess.

2. The assembly of claim 1, wherein the first positioning member includes a positioning flange to be inserted into a corresponding space of the end housing.

3. The assembly of claim 1, further comprising a circuit board assembly mounted to the controller housing; and
wherein the sensor includes a sensor circuit board electrically connected to the circuit board assembly.

4. The assembly of claim 1, wherein the controller further comprises a circuit board assembly mounted to a rearward side of the controller housing.

5. The assembly of claim 4, further comprising a thermally conductive cover over the circuit board assembly and mounted to the controller housing, wherein the cover is fastened to the end housing by thermally conductive fasteners.

6. An electric motor and controller assembly, comprising:
an electric motor comprising rotor shaft extending along a longitudinal axis from a rear end to an output end;
the electric motor further comprising an end housing surrounding the rear end of the rotor shaft, the end housing rotatably supporting the rear end of the rotor shaft;
a magnet mounted at the rear end of the rotor shaft;
a controller removably mounted at a rearward side of the end housing outside of the electric motor and parallel to the longitudinal axis, such that the controller can be disassembled from the end housing without disassembling the end housing from the electric motor;
the controller comprising a sensor and a controller housing, the controller housing including an alignment structure provided at an interface between the controller and the end housing for positioning the sensor relative to the magnet when the controller housing is mounted to the end housing; and
wherein the controller housing does not support the rotor shaft;
wherein the alignment structure comprises complementary mating features provided at the controller housing and the end housing;
wherein the end housing comprises a first cylindrical portion for rotatably supporting the rear end of the rotor shaft opposite to the output end of the rotor shaft and a second cylindrical portion adjacent to the first cylindrical portion, wherein the first cylindrical portion receives a bearing therein and the second cylindrical portion defines the mating feature of the end housing;
wherein the mating feature of the end housing includes an inner surface of the second cylindrical portion and a hollow space defined by the inner surface;
wherein the mating feature of the end housing further includes a cutout portion in the proximity of the hollow space;
wherein the mating feature of the controller housing includes a positioning flange inserted into the annular space and a protrusion inserted into the cutout portion; and
wherein the sensor is disposed at the protrusion and the magnet is attached to the first end of the rotor shaft and disposed in the hollow space of the second cylindrical portion.

7. The assembly of claim 6, wherein the sensor is provided inside the mating feature of the controller housing.

8. The assembly of claim 6, wherein the magnet includes a plurality of pieces arranged around the rear end of the rotor shaft.

9. The assembly of claim 6, further comprising a circuit board assembly mounted to a rearward side of the controller housing, wherein the sensor is connected to the circuit board assembly.

10. The assembly of claim 6, wherein the end housing has a stop surface for preventing further movement of the controller housing when the sensor is positioned in place; and
   wherein the controller housing further comprises a mounting surface abutting against the stop surface of the end housing when the controller is mounted to the motor.

11. The assembly of claim 10, wherein the magnet and the sensor are disposed in the second cylindrical portion and between the first cylindrical portion and the stop surface of the end housing.

12. The assembly of claim 10 wherein the end housing includes peripheral walls extending perpendicularly from the stop surface and the controller housing includes peripheral walls extending perpendicularly from the mounting surface, and wherein the peripheral wall of the end housing engages the peripheral wall of the controller housing when the controller housing is mounted to the end housing.

13. The assembly of claim 10 further comprising a shield cup surrounding the magnet and securing the magnet to the first end of the rotor shaft.

14. The assembly of claim 6, wherein the positioning flange is an annular flange disposed inside the hollow space of the second cylindrical portion and defining a central opening in which the magnet is disposed.

15. The assembly of claim 6 wherein the protrusion extends along a direction parallel to a central axis of the annular positioning flange.

16. The assembly of claim 6, wherein the alignment structure includes a first positioning member for positioning the sensor in radially relative to the longitudinal axis and a second positioning member for positioning the sensor circumferentially relative to the longitudinal axis.

17. The assembly of claim 6, wherein the controller further comprises:
   a circuit board assembly mounted to a rearward side of the controller housing; and
   a thermally conductive cover over the circuit board assembly and mounted to the controller housing; and
   wherein the cover is attached to the end housing by thermally conductive fasteners.

* * * * *